W. H. SITTS.
WATER METER.
APPLICATION FILED JAN. 2, 1909.
932,502.
Patented Aug. 31, 1909.
2 SHEETS—SHEET 1.
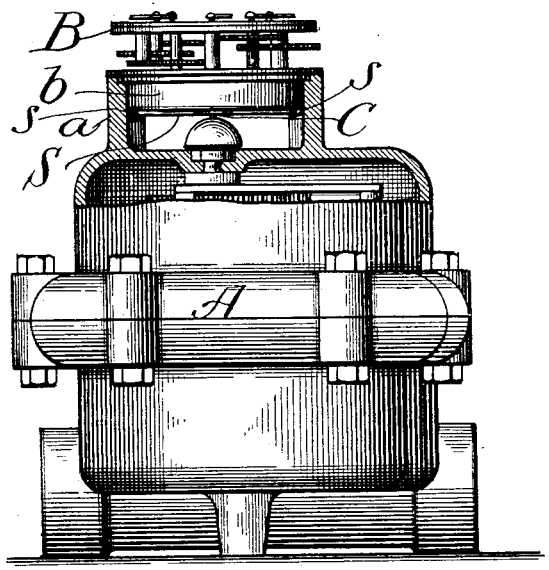
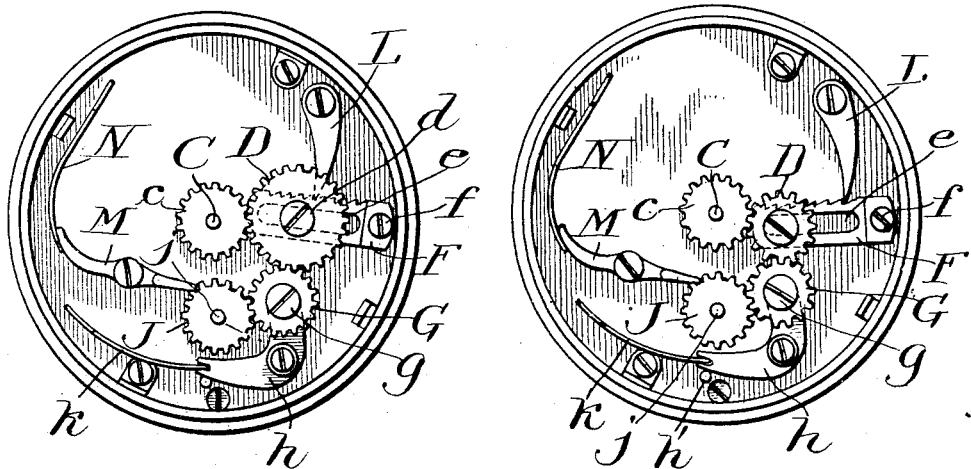
Witnesses
Inventor
William H. Sitts
by Frank D. Thomason
Atty

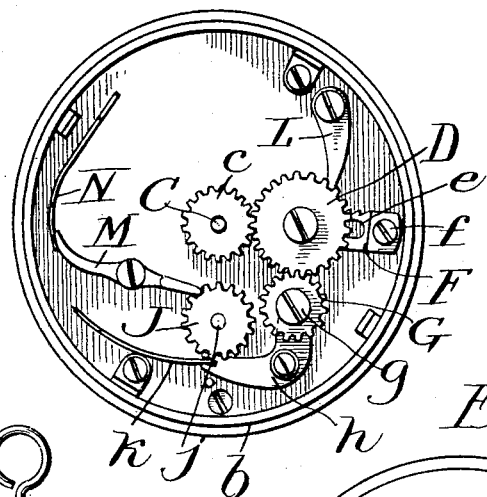
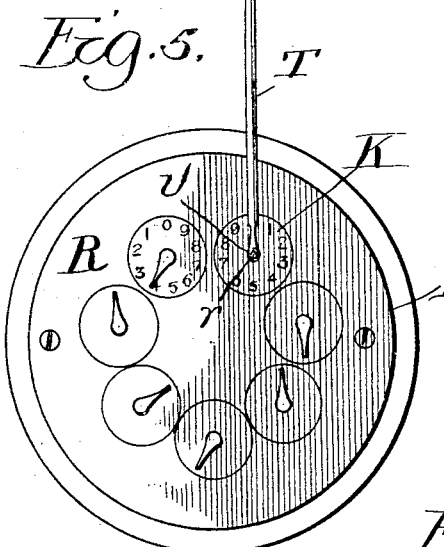
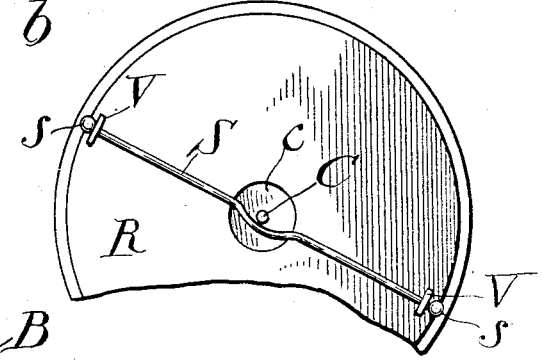
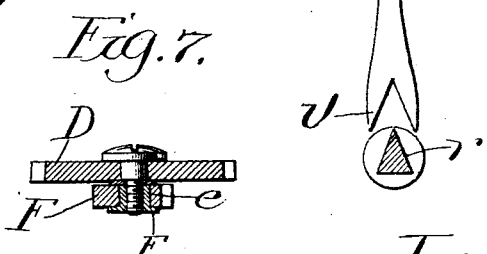

UNITED STATES PATENT OFFICE.

WILLIAM H. SITTS, OF CHICAGO, ILLINOIS.

WATER-METER.

932,502.  Specification of Letters Patent.  Patented Aug. 31, 1909.

Application filed January 2, 1909. Serial No. 470,414.

*To all whom it may concern:*

Be it known that I, WILLIAM H. SITTS, a citizen of the United States, and a resident of Chicago, in the county of Cook and State of Illinois, have invented certain new and useful Improvements in Water-Meters, of which the following is a clear, full, and exact description.

My invention relates to the actuating mechanism for the registers of water meters, and its object is to absolutely prevent the possibility of the indicating devices of the registers being rotated in the reverse direction to make the same indicate a less amount of water or other liquid than has passed through the meter, and its object is also to adapt my improved register actuating mechanism to any meter regardless of the measuring capacity of the immediate water driven members thereof, without necessitating a change of the gear either on the shaft of the water-wheel or turbine of the meter, or on the spindle of the units-indicator of the meter. This I accomplish by the means hereinafter fully described and as particularly pointed out in the claims.

In the drawings:—Figure 1 is a side elevation of a water meter showing the upper portion thereof to which my improved register actuating devices are attached, in section. Fig. 2 is a plan view of the underside of said register and its actuating mechanism, removed from the meter, and drawn to a larger scale. Fig. 3 is a similar view showing the employment of smaller transmission gear. Fig. 4 is a similar view illustrating in a slightly exaggerated manner, the position of one of said gears, when an attempt is made to reverse the action of the registering devices. Fig. 5 is a plan view of the face of the indicating devices, showing the use of a templet for ascertaining what the position of the index hand or pointer would be, when the same has been removed by accident or design. Fig. 6 is a detail view showing a broken away portion of said templet, and the outer end of the spindle of said index hand drawn to an exaggerated scale. Fig. 7 is a vertical transverse section taken through the adjusting frame and block. Fig. 8 is a plan view of the underside of said meter.

In the drawings A represents a conventional water meter, and B the registering mechanism which is seated in the upper edges of a cylindrical housing $a$ cast in one piece with and projecting upward from the upper end of the case of the water meter, in such a position that the rim of the case $b$, inclosing the actuating mechanism of the registering devices, will depend down into the same and be protected thereby.

The shaft C driven by the water meter and designed to transmit the action thereof to the actuating mechanism of the register, extends centrally up through the bottom of case $b$, and has a small gear $c$ on its upper end. This main-gear $c$ meshes with a transmission-gear D, that is journaled on the barrel of a screw $d$, whose screw-threaded end is tapped into a block E, which latter is adjustable longitudinally in the longitudinal slot $e$ of a frame F and maintained in its adjusted position by tightening up said screw. Frame F is pivoted at its end farthest from main gear $c$ by a screw $f$, which latter can be tightened so as to assist in retaining said frame F in any position to which it may be adjusted.

Transmission gear D engages an idle-gear G journaled on a screw stud $g$, tapped into the end of a bell-crank frame $h$ that is fulcrumed at about its angle. Idle-gear G meshes with a gear J on the adjacent end of the spindle $j$ of the index hand of the units dial K, and is kept in engagement with the transmission gear D and the units-gear J, by means of a leaf-spring $k$ engaging the end of the bell-crank $h$, opposite gear G. Gear D can be removed from frame F and a larger or smaller gear substituted in its place. In Fig. 3 of the drawing gear D is smaller than the corresponding gear used in Fig. 2, and in order to keep said gear in constant mesh with main gear $c$ and idle-gear G, I engage the serrated edge of frame F opposite gear G with a pivoted dog L. Changing the gear D from a large to a small one or vice versa, necessitates the adjustment of the axis of said gear farther from or nearer to the axes of gear $c$ and G. This I accomplish by adjusting screw $d$ longitudinally in the slot of frame F, and by adjusting frame F on its pivot, which latter requires the changing of the point of contact of the dog L from one to the other of the teeth or serrations of the adjacent edge of frame F. A pawl M, which is, preferably, pivoted mediate its ends, engages the units-gear J and absolutely prevents the reverse motion of said gear, but permits that rotation thereof that will result in the correct registration of the liquid passing through the meter, through the medium of the spindle of the units dial, by virtue of a leaf-spring N that engages its end opposite gear J, substantially as shown in the drawings.

Pawl M absolutely prevents the reverse motion of the gear J, but, if the main gear c is revolved in the wrong direction, the idle-gear G will be carried out of engagement with the units-gear J, and skip or ride over the teeth of the same, substantially as shown in Fig. 4 of the drawings.

In order to prevent fraudulent tampering with the index hands of the dials on the face of the register the ends r of the spindle thereof, immediately back of where the said index hands are secured, are made of an acute isosceles triangular shape with the acute angle thereof pointing in the same direction as the pointed extremity of the said index hand. When the said index hands have been removed, either accidently or otherwise, I employ a templet T, the extremity of which is provided with a recess v the sides of which correspond to the acute angle of the end r of the spindle, and when this is done I fit said recessed end upon the triangular shaped end of the spindle and the said templet will extend in the same direction as the index hand would have extended had it remained in position, and will enable the operator or person reading the register to ascertain and correctly read the dial.

In order to thoroughly seal the case b of the actuating mechanism for the register, and prevent the possibility of its being tampered with without detection, I close the bottom of said case by a suitable plate R, which, at points diametrically opposite each other, is, near its edge provided with suitable apertures or small openings down through which short lugs V, V, project. These lugs below the plane of said plate R are provided with openings therein, and a wire S, preferably, of soft copper is threaded diametrically through the openings in said lugs. The ends of this wire S are provided with lead knobs or balls, or suitable enlargements s, that prevent the wire from being accidentally withdrawn from said lugs. The central portion of this sealing is provided with a segmental curved portion so as to enable it to make a detour around the shaft C. When the case is sealed in this manner any tampering with the case inclosing the actuating mechanism will be immediately discernible.

What I claim as new is:—

1. A water meter comprising registering mechanism, a shaft for actuating the same, a gear thereon, a units spindle, a gear on said units spindle, a gear adjustable toward and from said first mentioned gear, a yielding bracket, and an idle-gear mounted on said bracket and engaging said adjustable gear and said units gear.

2. A water meter comprising registering mechanism, a shaft for actuating the same, a gear thereon, a units spindle, a gear on said units spindle revoluble in but one direction, a gear adjustable toward and from said first-mentioned gear, a yielding bracket, and an idle-gear mounted on said bracket and engaging said adjustable gear and said units gear.

3. A water meter comprising registering mechanism, a shaft for actuating the same, a gear thereon, a units spindle, a gear on said units spindle, a gear adjustable toward and from said first mentioned gear, an idle gear engaging said adjustable gear and said units gear and a vibratory frame on which said idle gear is journaled.

4. A water meter comprising registering mechanism, a shaft for actuating the same, a gear thereon, a units spindle, a gear on the units spindle revoluble in but one direction, a gear adjustable toward and from said first mentioned gear, an idle gear engaging said adjustable gear and said units gear, and a vibratory frame on which said idle gear is journaled.

5. A water meter comprising registering mechanism, a shaft for actuating the same, a main gear thereon, a units spindle, a gear on said units spindle, an idle gear engaging said units gear, a gear for transmitting the motion of the main gear to the idle gear, and means on the axis of said last mentioned gear whereby the same may be adjusted to and from both the main gear and the idle gear.

6. A water meter comprising registering mechanism, a shaft for actuating the same, a main gear thereon, a units spindle, a gear on said units spindle, an idle gear engaging said units gear, a vibratory frame on one end of which said idle gear is journaled, a gear for transmitting the motion of the main gear to the idle gear, and means on the axis of said last mentioned gear whereby the same may be adjusted to and from both the main gear and idle gear.

7. A water meter comprising registering mechanism, a shaft for actuating the same, a main gear thereon, a units spindle, a gear on said units spindle, an idle gear engaging said units gear, a gear for transmitting the motion of the main gear to the idle gear, and a frame in which said transmitting gear is adjustable longitudinally and which is pivoted at the end farthest from said main gear.

8. A water meter comprising registering mechanism, a shaft for actuating the same, a main gear thereon, a units spindle, a gear on said units spindle, an idle gear engaging said units gear, a vibratory frame on one end of which said spindle is journaled, a gear for transmitting the motion of the main gear to the idle gear, and a frame in which said transmitting gear is adjustable longitudinally and which is pivoted at the end farthest from said main gear.

9. A water meter comprising registering mechanism, a shaft for actuating the same, a main gear thereon, a units spindle, a gear on said units spindle, an idle gear engaging said units gear, a vibratory frame on one end of which said idle gear is journaled, a gear for transmitting the motion of the main gear to the idle gear, a frame having a serrated longitudinal edge in which said transmitting gear is adjustable longitudinally and which is pivoted at the end farthest from said main gear, and a dog for engaging the serrations on the edge of said frame.

10. In a water meter the combination with a register, actuating mechanism therefor, a case inclosing the same having lugs depending from its lower edge having openings therein, a plate having apertures therein through which said lugs project, and a wire threaded through the openings in said lugs.

In testimony whereof I have hereunto set my hand this 23rd day of December, A. D. 1908.

WILLIAM H. SITTS. [L. S.]

Witnesses:
FRANK D. THOMASON,
E. K. LUNDY.